United States Patent
Clarke (10) Patent No.: US 11,250,097 B1
(45) Date of Patent: Feb. 15, 2022

(54) WEB USER INTERFACE CONTAINER IDENTIFICATION FOR ROBOTICS PROCESS AUTOMATION

(71) Applicant: Pegasystems Inc., Cambridge, MA (US)

(72) Inventor: Christopher Arthur Clarke, Suwanee, GA (US)

(73) Assignee: PEGASYSTEMS INC., Cambridge, MA (US)

( * ) Notice: Subject to any disclaimer, the term of this patent is extended or adjusted under 35 U.S.C. 154(b) by 0 days.

(21) Appl. No.: 17/201,206

(22) Filed: Mar. 15, 2021

Related U.S. Application Data (60) Provisional application No. 63/032,485, filed on May 29, 2020, provisional application No. 63/032,625, filed on May 31, 2020.

(51) Int. Cl.
  *G06F 16/957* (2019.01)
  *G06F 40/143* (2020.01)
  *G06F 16/9535* (2019.01)
  *G06F 16/958* (2019.01)

(52) U.S. Cl.
  CPC ........ *G06F 16/9577* (2019.01); *G06F 16/958* (2019.01); *G06F 16/9535* (2019.01)

(58) Field of Classification Search
  CPC .............. G06F 16/9577; G06F 16/958; G06F 16/9535; G06F 40/143
  USPC ................................................. 715/234, 200
  See application file for complete search history.

(56) References Cited

U.S. PATENT DOCUMENTS

| | | | | |
|---|---|---|---|---|
| 7,313,564 B2* | 12/2007 | Melamed | ........... | G06F 11/3684 707/999.01 |
| 8,856,746 B2* | 10/2014 | Mishra | ............... | G06F 11/3696 717/124 |
| 9,135,151 B2* | 9/2015 | Betak | ................. | G06F 11/3692 |
| 9,465,726 B2* | 10/2016 | Kozhuharov | ....... | G06F 11/3696 |
| 9,600,401 B1* | 3/2017 | Haischt | .............. | G06F 11/3664 |
| 2003/0237053 A1* | 12/2003 | Chen | .................. | G06F 16/9577 715/234 |
| 2005/0268285 A1* | 12/2005 | Bagley | ............... | G06F 11/3688 717/124 |
| 2007/0022407 A1* | 1/2007 | Givoni | ............... | G06F 11/3684 717/124 |
| 2007/0130529 A1* | 6/2007 | Shrubsole | ............... | G06F 9/451 715/762 |
| 2009/0077422 A1* | 3/2009 | Khaladkar | .......... | G06F 11/3684 714/33 |
| 2011/0035630 A1* | 2/2011 | Hayutin | .............. | G06F 11/3688 714/46 |
| 2013/0339798 A1* | 12/2013 | Choudhary | ......... | G06F 11/3684 714/38.1 |

(Continued)

*Primary Examiner* — Manglesh M Patel
(74) *Attorney, Agent, or Firm* — Patent Law Works LLP (57) ABSTRACT

Modern Web applications can be highly dynamic and have a complicated HTML hierarchy. This makes automation of business processes that use Web applications difficult for Web applications that do not have a flat hierarchy and which have frequent minor updates. A computer-implemented method for automatically identifying containers of Web applications for robotics process automation is disclosed. A container engine uses container identification algorithms to identify candidate containers and generate container data describing the relevant hierarchy for robotics process automation of user interface controls of a Web application.

17 Claims, 10 Drawing Sheets

(56) References Cited

U.S. PATENT DOCUMENTS

2020/0356466 A1\* 11/2020 Thangam ............ G06F 11/3692
2021/0256076 A1\* 8/2021 McMurray ............ G06F 16/957

\* cited by examiner

Document element (HTML) *(8 user input control descendants)*
    DIV 1 *(8 user input control descendants)*
        DIV 2 *(5 user input control descendants)*
            DIV 3 *(3 user input control descendants)*
                INPUT
                INPUT
                BUTTON
            DIV 4 *(2 user input control descendants)*
                SELECT
                BUTTON
        DIV 5 *(3 user input control descendants)*
            INPUT
            INPUT
            BUTTON

WEB USER INTERFACE CONTAINER IDENTIFICATION FOR ROBOTICS PROCESS AUTOMATION

CROSS-REFERENCE TO RELATED APPLICATIONS

This application claims priority to U.S. Provisional Application Ser. No. 63/032,485, filed May 29, 2020, titled "Robotics Process Automation", and to U.S. Provisional Application Ser. No. 63/032,625, filed May 31, 2020, titled "Robotics Process Automation", each of which are hereby incorporated herein in their entirety by this reference.

FIELD OF THE INVENTION

The present disclosure generally relates to identifying user interface controls of web applications for robotics process automation. More particularly, the present disclosure is related to identifying containers.

BACKGROUND

Robotics Process Automation is used to automate business processes that are executed by using desktop applications and Web Applications (e.g., through the browser of a user's computer). Robotics Process Automation allows a business to identify business processes in advance and write automations that perform the task(s) against the user interfaces in the desktop applications and web browser.

An example of a business process would be to: "Update the phone number for an account holder". While this is a seemingly simple business process, typically in an enterprise, such a process would require a user to visit multiple desktop applications and web sites to update the account holder's phone number fully across all data stores.

Manual implementation of such routine business processes have many potential downsides. Some of the downsides to this include: 1) potential errors if the phone number is entered incorrectly in an application, or if an application is accidentally skipped; 2) the mental burden on a user to keep track of all the places the phone number needs to be updated; and 3) the training time and cost can be significant to train users to implement a business process.

One aspect of Robotics Process Automation is that it requires identifying the user interface controls in the applications that automation(s) will interact with. In some Robotics Process Automation applications, this process of identifying user interface controls is described as "interrogation." When a control is interrogated, a designer creates a software object to represent it, known as an automation control. Because user interfaces are internally designed as hierarchies of controls, interrogating an automation control can also result in its ancestor controls being interrogated as well.

A typical hierarchy of controls on a desktop application could be something like:
  Main Application Form
  Panel used to organize controls visually
    Group box containing Contact information
      Text box containing phone number There are a variety of ways that automating business processes for interactions with user interface controls of web applications are more difficult than for automating interactions with user interface controls for desktop applications.

For desktop applications, the concept of hierarchies of controls is generally very straightforward. The ancestor controls above a user input control (e.g., button, text box, menu item, etc.) tend to be limited in number and correspond well to the visual layout of the desktop application's user interface.

However, for complex web pages, the concept of ancestor controls is significantly more complicated. One complication is that dynamic, highly interactive web applications can be made up of thousands of HTML elements, which are the controls used to create the visual layout of the application. Because of this, a user input element, such as a button, could have more than 30 layers of ancestor elements. This is typically a much deeper hierarchy than would be found in a desktop application.

Another complication for automating web application includes that there can be minimal visual correlation between the layout viewed onscreen and the layout of ancestor elements in the hierarchy. An application may not look highly layered on screen, but may contain a large number of container elements used to add styling, handle events and visually group child elements Yet another complication for automating Web applications is that Web applications are often updated frequently (e.g., once a week is not uncommon). Consequently, the hierarchies of ancestor elements change without there being an obvious visual change to the layout. Changes could include adding or removing elements from the ancestry or fundamentally changing the type of element(s) in the ancestry. As an example, a DIV element could change to a MAIN element if the application is being modernized to HTML5 standards.

A variety of techniques exist to handle web pages that had fairly static content and which used FORMs to organize data entry fields. However, a problem occurs in that these conditions aren't satisfied for many types of web pages.

As an example, for older types of web pages, the HTML element user input control may be interrogated during Robotic Process Automation, using a few simple rules. For example, the automation control that is created having a very flat hierarchy in the sense that a control is typically made an immediate child of the automation control created for the HTML document itself. An exception to this may be as follows. Any interrogated HTML elements that are contained in a FORM element will have a parent automation control created that represents the FORM:
  WebPage control (HTML document)
    Form control (FORM element)
      Button control (interrogated INPUT element)

This comparatively simple approach was generally suitable in older pages that had fairly static content and which used FORMs to organize data entry fields. However, in modern single-page web applications, FORMs may or may not be used, and if they are, it may be for isolated groups of controls within a larger grouping of user input fields. In that case, making the FORM an automatic container does not yield a useful result.

Modern Web applications thus pose particular problems. One option to deal with modern web applications is for an automation control to be manually designated as a container. Any controls interrogated after that designation that are descendants of the HTML element associated with the container automation control will have their automation controls created as children of the designated container:
  WebPage Control (HTML Document)
    Container control (DIV element. This was manually identified by the user as a container)
      Button control (interrogated INPUT element that is a child of the DIV in the DOM)

This manual designation option provides a means to custom build a hierarchy of automation controls, however, it often requires the person doing the designing to have to use the browser's built in debugger tool to browse the DOM hierarchy looking for appropriate elements to designate as containers. This can be difficult in that it requires delegation to skilled experts, which is undesirable in terms of cost and complexity.

An unresolved problem in the art of Robotics Process Automation is that automatic identification of container controls is very limited, and in the vast majority of cases interrogated elements have their automation controls created under the document. In a large complex application, this can result in confusion because it is difficult to identify groupings of controls when all controls are at the same level in the hierarchy.

This can also result in poor performance when matching HTML elements to their automation controls the next time interrogation is started. One of the key features of automation control matching is confinement of search scope for better performance. When searching for a matching HTML element for an automation control, the scope of the search is the universe of controls that are descendants of the automation control's parent control. In the FORM hierarchy mentioned above, when attempting to match a button automation control on the FORM, the only HTML elements that are searched for a match are those that are descendants of the FORM element on the page. Given that the matching process can be a linear search, having a smaller search area naturally requires less computing power. This is coupled with the fact that a standard set of APIs are available in every modern browser that can return all descendants of an HTML element with very high performance.

When all interrogated automation controls are immediate children of the document's automation control, the search area for a matching control becomes the entire document, which results in computationally intensive search for a match. Having some degree of hierarchy in the list of interrogated automation controls significantly improves performance.

SUMMARY

The present disclosure relates to systems and methods for generating information to aid in automatically identifying a hierarchy of user interface controls in web applications. This may include identifying containers, where the containers identify levels of hierarchy of user interface controls for the Web application. Some potential applications include using the generated information for robotics process automation.

In one implementation of a computer-implemented method, a list of HTML is collected of a Web application. The method automatically determines if a particular HTML element in the list of HTML elements is a container for user interface controls of the Web application. The determination may be based on the particular HTML element satisfying a container identification criteria indicative of a likelihood the HTML element is a candidate to be a container for automation of user interface controls of the Web application. In some implementations, the container identification criteria includes an HTML5 tag criteria. In some implementations, the container identification criteria includes an Accessible Rich International Applications (ARIA) role. In some implementations, the container identification criteria includes identifying a bounding container for other containers. For example, in some implementations, a bounding container is identified based at least in part on a count of user input controls in a descendent hierarchy.

In some implementations, the containers identify levels of hierarchy of user interface controls for the Web application and the method further includes querying the containers to identify user interface controls for robotics process automation of a business process involving the Web application.

In one implementation of a computer-implemented method, HTML elements of a Web application are monitored. The method automatically determines if at least one container identification criteria is satisfied indicative of a likelihood an HTML element is a candidate to be a container for automation of user interface controls of the Web application. Container data is stored regarding containers and children of containers for automation of user interface controls of the Web application. In some implementations, the stored container data is utilized to perform robotics process automation of a business process that uses the Web application.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure describes systems and methods for generating information about the user interface controls of Web application to aid in Robotics Process Automation. In particular, a database may store attributes of controls to aid in identification. There is a hierarchy of identified controls, and the control data may be arranged in a hierarchy of containers. Controls that contain other controls are containers, where controls in a database are arranged in a hierarchy of containers. An aspect of Robotics Process Automation is identifying, storing, and using a container control hierarchy for Robotics Process Automation.

Figure 1:
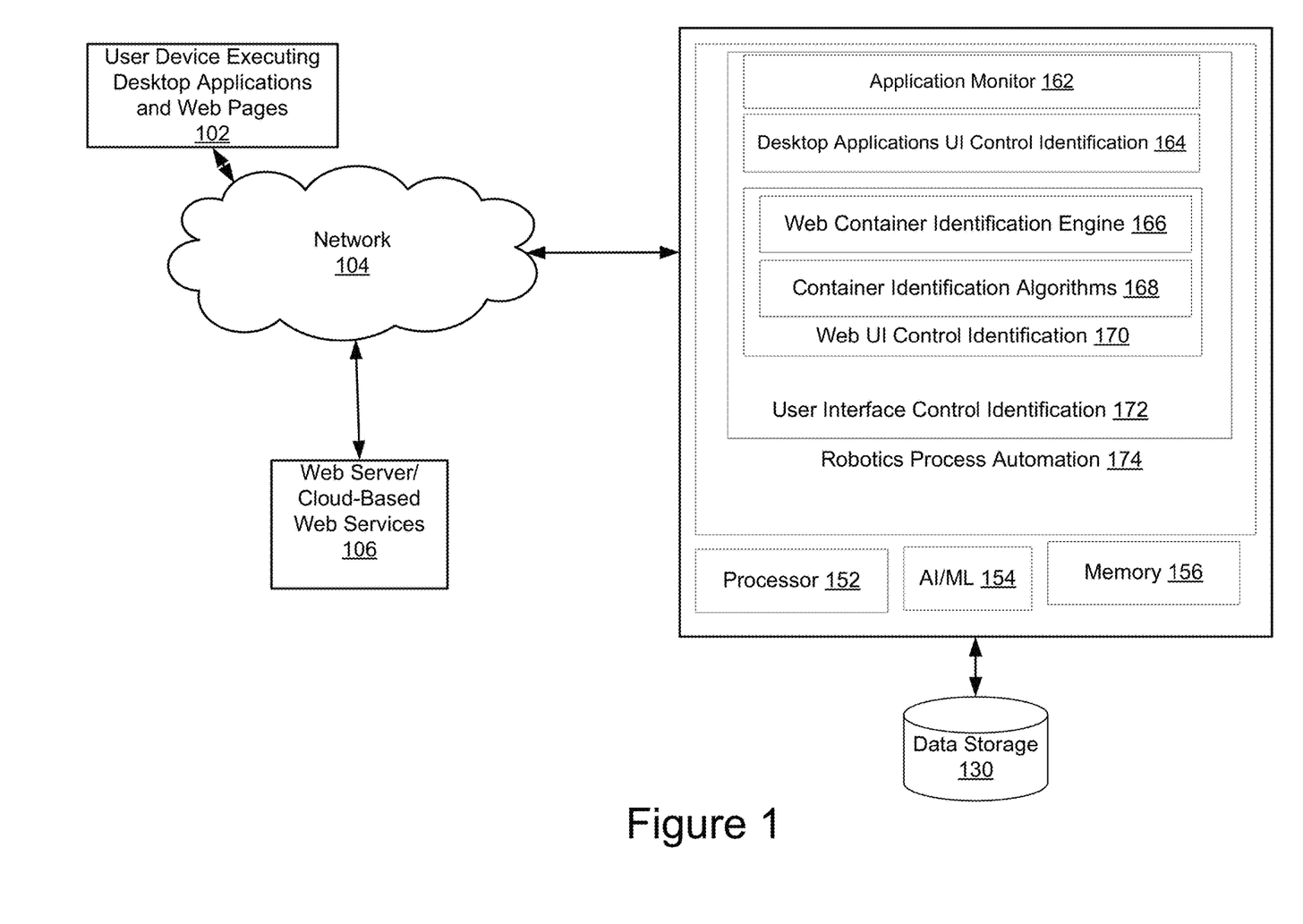
FIG. 1 is a high level block diagram illustrating a system for automatically identifying UI controls for Web applications in accordance with an implementation.

FIG. 1 is a high-level figure of an ecosystem for practicing system and methods of the disclosure in accordance with an implementation. A user device 102 executes desk top applications and Web pages of Web applications. The Web applications may, for example, be supported by Web Server or Cloud Based Web Services 106. As an illustrative example, a network 104 (e.g., the Internet) may provide access to Web Applications.

A robotic process automation system 174 may be implemented in different hardware configurations to support Robotics Process Automation software. For example, Robotics Process Automation 174 may be supported using a server-based implementation for an enterprise having a local network or wide area network. However, other implementations may be used, such as a cloud assisted implementation, a cloud based implementation, etc.

For the purposes of illustration, a server-based implementation is illustrated having a memory 156, a processor 152, and Artificial Intelligence/Machine Learning system model 154, and interfaces to a data storage unit 130.

An application monitor 162 supports monitoring desktop applications and web applications executed by a browser of a user device 102. For example, the application monitor 162 may use browser-based techniques and/or software assists on user device 102 to monitor the desktop application and web applications running on a user device 102. For the case of web applications, this may include reporting on HTML elements of web pages. However, it will be understood that any known technique to generate reports or otherwise monitor HTML elements of web pages of web application may be utilized.

Software to support desktop applications UI control identification 164 may be provided. This may include software to support a comprehensive robotics process automation solution in terms of overall user interface control identification 172.

In one implementation, Web UI control identification 170 is supported using a web container identification engine 166 and container identification algorithms 168. The web container identification engine 166 and container identification algorithms may be implemented as computer software program code stored on a memory and executable on a processor. The web container identification engine 166 and container identification algorithms 168 generate container information for identifying Web application controls as discussed below in more detail.

Figure 2:
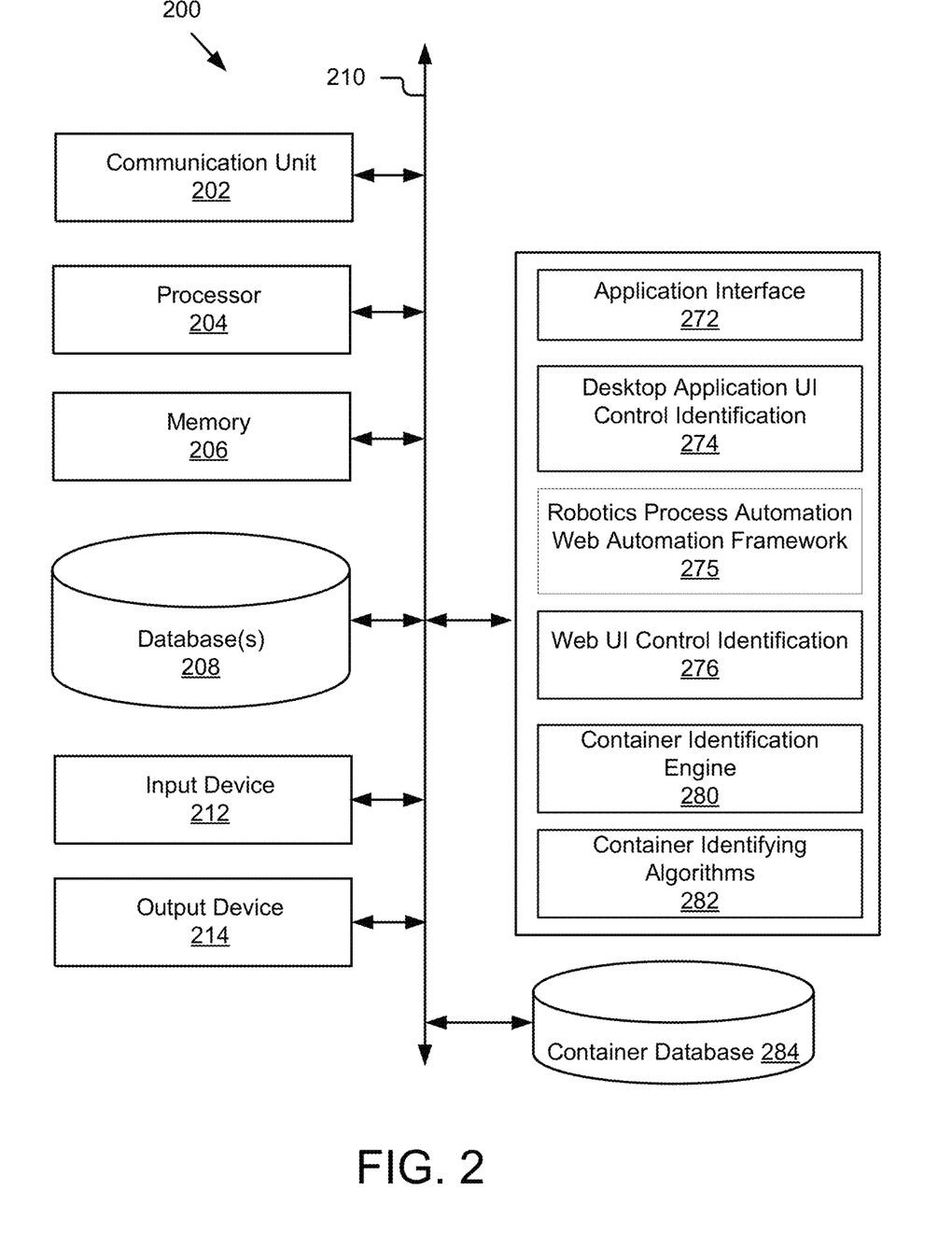
FIG. 2 is a block diagram of a server based implementation of a system to automatically identify UI controls for Web applications in accordance with an implementation.

FIG. 2 illustrates that the Robotics Process Automation may be implemented in a server-based implementation having, for example, an internal communication bus 210, a network communication unit 202, a processor 204, memory 206, databases 208, input device 212, output device 214, a container database 284, and software module stored on a computer storage device to implement, for example, an application interface 272, desktop application UI control identification 274, robotics process automation Web automation framework 275, Web UI control identification 276, container identification engine 260, and container identifying algorithms 282.

Figure 3:
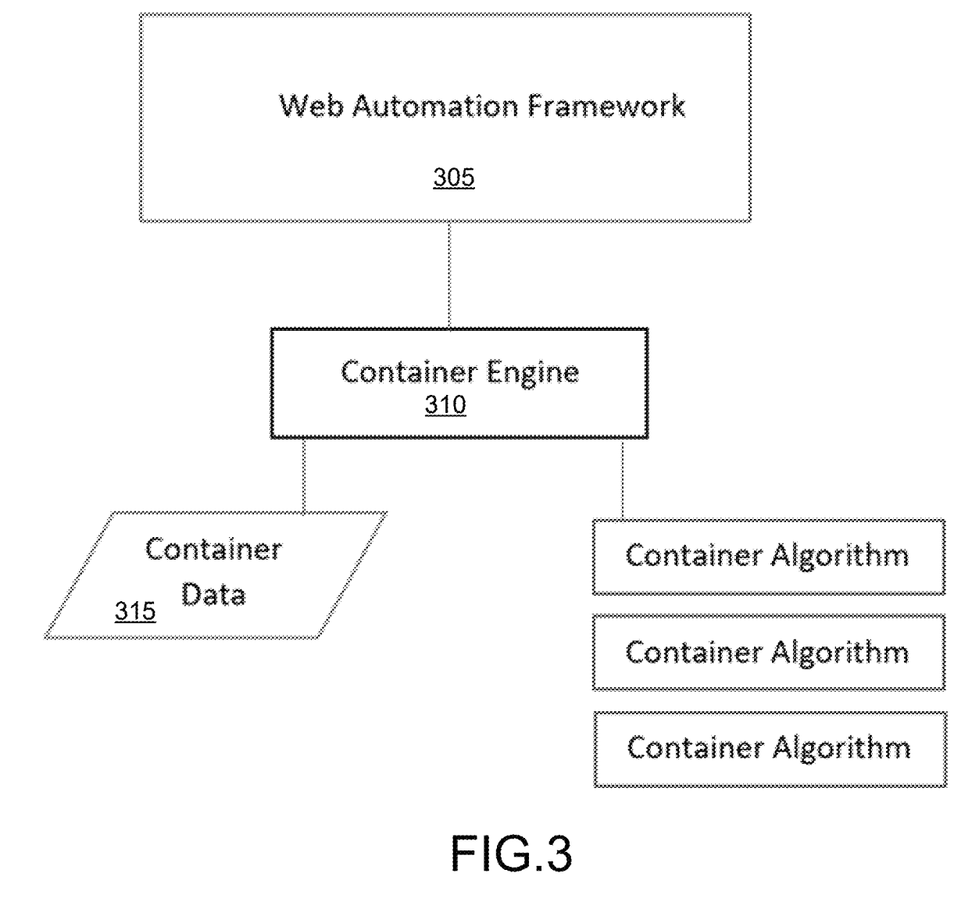
FIG. 3 is a block diagram of an automation framework, container engine, and container algorithms in accordance with an implementation.

FIG. 3 illustrates a Web automation framework 305 in accordance with an implementation. FIG. 3 illustrates an example of robotics automation browser-injected components to identify containers. The Web automation framework 305 may, for example, be implemented to call a container engine, which in turn accesses container algorithms to implement a process to generate container data for a web application. For example, container data 315 may be generated for an individual web application used in a business process, or for two or more web applications used in the same business process. As another example, container data may be generated for two or more different business processes.

An HTML-based application may contain a large number (e.g., hundreds or even thousands) of container HTML elements that have HTML elements as children. These can be described as physical containers in the sense that they constitute the container lattice that is delivered by a Web Server. In addition to a large potential number of container elements, there may be a large number of ancestor containers. However, for the purpose of identifying user control interfaces of the Web applications, a subset of all container elements can be identified that are likely to be permanent members of the application or that can be identified in a fuzzy manner. This makes the resulting control identification, using the resulting container data, robust to updates in the Web Application. It also had other benefits in terms of the amount of container data that need to be stored for robotics process automation.

One aspect is that container identification can be performed automatically with a meaningful level of hierarchy in the list of interrogated automation controls, in a manner comparatively insensitive to internal layout changes that occur in the application.

In one implementation, the container identification engine collects an initial list of HTML elements, then iterates over the element ancestry of each element in the list. Because all ancestries eventually reach the document, elements will share portions of their ancestries. Each ancestor is passed through the list of algorithms and each algorithm is allowed a chance to identify the element as a container. For a performance enhancement, an algorithm's treatment of an element may be stored on that element, so it does not get processed by an algorithm more than once. In one implementation, elements that are children of containers have the identified container saved on them. Containers maintain a list of their children.

In one implementation, the control identification engine provides an API to query containers, children of containers, and the parent container of any element.

Some examples of container identifying algorithms will now be described. A container identifying algorithm is a class that implements an algorithm API and which can be called to determine if a particular HTML element is a container using identification criteria. One example of a container identification algorithm is a special HTML tag name. For example, certain HTML5 tags can indicate a strong probability that an element would make a suitable container. As examples, there are published lists of standard HTML5 tags. Not all of the HTML5 tags are relevant to indicating a strong probability an element would make a suitable container. However, one of ordinary skill in the art may select one or more suitable HTML5 tags from published lists. Some examples of HTML5 tags relevant to indicating a strong probability an element would make a suitable container include MAIN, HEADING, and TABLE.

Another example of a container identification algorithm is an ARIA role. ARIA (Accessible Rich Internet Applications) is a standard that can be used to make web pages more accessible for people with disabilities. An ARIA role is used to denote the purpose of an element for the accessibility processor used by the browser. There are published lists of ARIA roles, states, and properties. As examples, some of the ARIA roles include button, search box, etc. One of ordinary skill in the art can select one or more ARIA roles to aid in container identification. ARIA is not guaranteed to be implemented, but if it is, certain roles in ARIA can indicate a strong probability that an element would make a suitable container.

In some implementations, an algorithm calculates the likelihood an element represents a container for a visual section of a Web application. For example, on a complex single page application, there may be major "sections" of an application, such as Navigation, Menu Bar, and Main. An individual section may in turn have sub-sections. For example, a Main section may include a tab-type control and groups of user input controls. User input controls are often grouped together for related data fields. For example, a group may contain name/address data fields as one example.

User interface controls that a human would interact with on a Web application are commonly represented by INPUT, SELECT, and BUTTON elements although more generally there may be other user input controls on an individual application basis. User input controls are controls that are specially designated to receive user input. In one implementation, initially, every element that has a user input control in its descendant hierarchy is updated to have a count of the number of input controls that it contains, at any level below itself. In one example, a container identification algorithm is a user input control count transition algorithm.

One aspect of the input control count algorithm is that it identifies containers based on the likelihood that they are the bounding container for multiple bounding containers below them. As an example, an algorithm in a first step identifies all of the INPUTs, SELECTs, and BUTTONs on a page. In a second step, the ancestry may be walked for each one, and a count property added to each element. This count property tracks how many times an element is visited. For example, a DIV element that has four INPUT elements among its descendants would have a count of four. This counting process may be used to eliminate any element that doesn't contain a user-interface control. In a third step, the identified containers are walked. In one implementation, if a container is not visible or has a size below a certain threshold (e.g., 0,0) then it is eliminated. In a fourth step, if the count for a container's parent is greater than the count of the container, then the parent is presumed to represent a group of controls. This permits a lowest common containing element to be identified (e.g., analogous to how degrees of cousins are identified by a common ancestor). In a fifth step, a smaller set of containers is identified. For example, a threshold may be used, such as specifying that a candidate container contains a minimum threshold percentage (e.g., at least 5%) of all the user interactive elements on the page).

Figure 4:
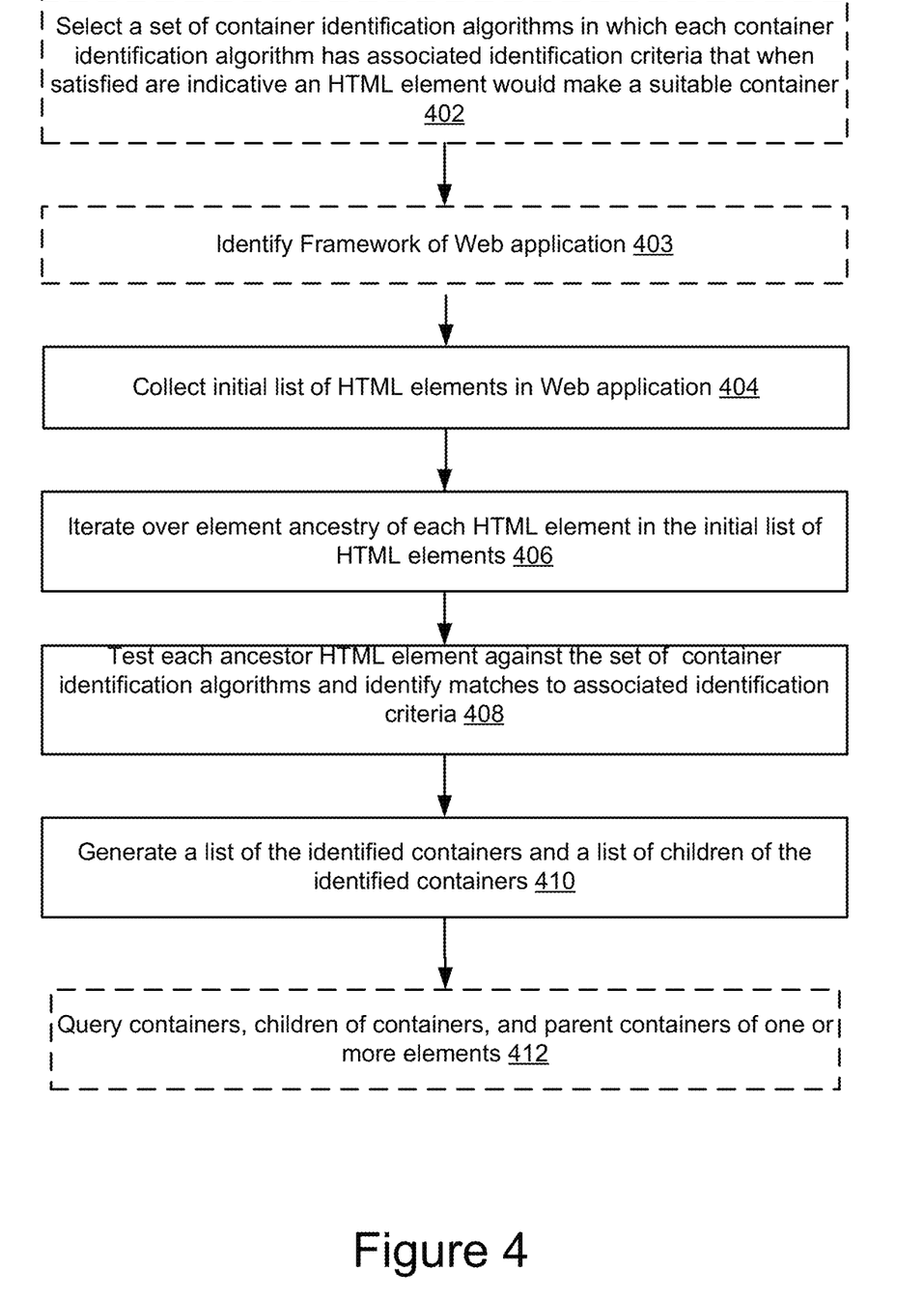
FIG. 4 is a flow chart of an example general method for generating container data for identifying UI controls for Web applications in accordance with an implementation.

FIG. 4 is a high level flow chart in accordance with an implementation. In block 402, a set of container identification algorithms is selected. This can be done once or periodically updated (e.g., to account for changes to Web application technologies). However, more generally, the choice of container identifications could be optimized based on other considerations or based on a priori knowledge. For example, some business processes use only a limited number and type of Web applications. There may also be special circumstances for particular businesses.

Each individual container identification algorithm has associated identification criteria that when satisfied are indicative an HTML element would make a suitable container. In block 403, the identity of the framework of a Web application is determined.

In block 404, an initial list of HTML elements in the Web application is collected. As previously discussed, the collection process may be implemented in different ways, depending on technical implementation.

In block 406, the process iterates (e.g., walks) over the element ancestry of each HTML element in the initial list of HTML elements.

In block 408, each ancestor HTML element is tested against the set of container identification algorithms. Matches are identified to the associated container identification algorithms.

In block 410, a list is generated of the identified containers and a list of children of the identified containers. This list may, for example be stored as container data in a data storage unit. This list might be analogized into a map showing the containers and hierarchies that are relevant for Robotics Process Automation in regards to automating business processes in which a human user would ordinarily do tasks such as enter data in text boxes, read information from specific fields for use in other applications, click on control buttons, etc.

In block 412, the stored list may be used for purposes such as querying containers, children of containers, and parent containers of one or more elements.

Figure 5:
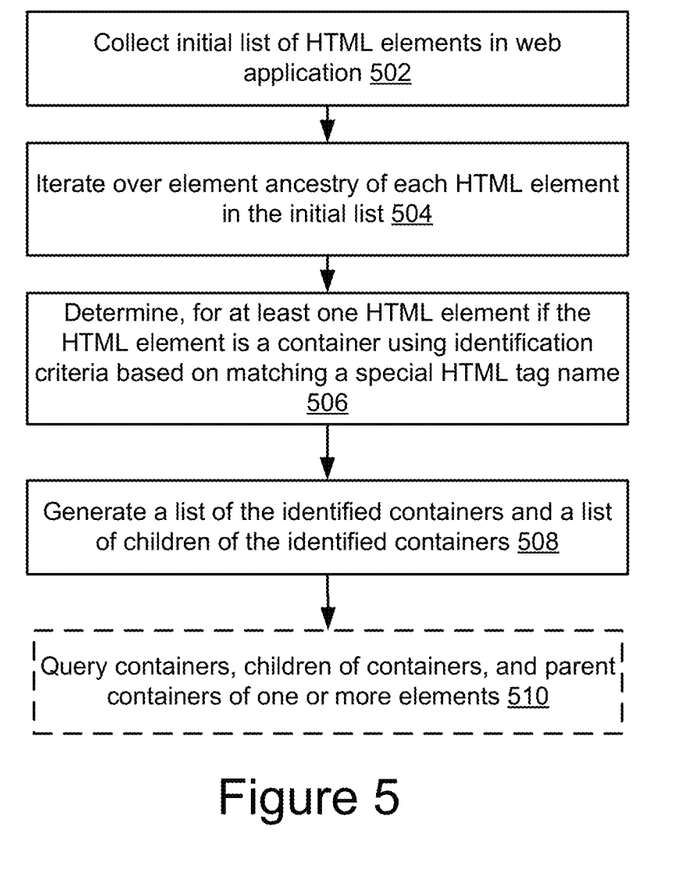
FIG. 5 is a flow chart of an example alternate method, based on HTML tags, to generate container data in accordance with an implementation.

FIG. 5 is a flow chart illustrating an example in which the container identification algorithm is a special HTML tag name (e.g., a special HTML tag name in HTML5). In block 502, an initial list of HTML elements in the application is collected. In block 504, the process iterates over the element ancestry of each HTML element in the initial list. In block 506, a determination is made for at least one HTML element if the HTML element is a container using an identification criteria based on matching a special HTML tag name. In the most general case there may be one or more special HTML tag names for which potential matches are identified. In block 508, a list is generated of the identified container and a list of children of the identified containers. In block 510, the process queries containers, children of containers, and parent containers of one or more elements.

Figure 6:
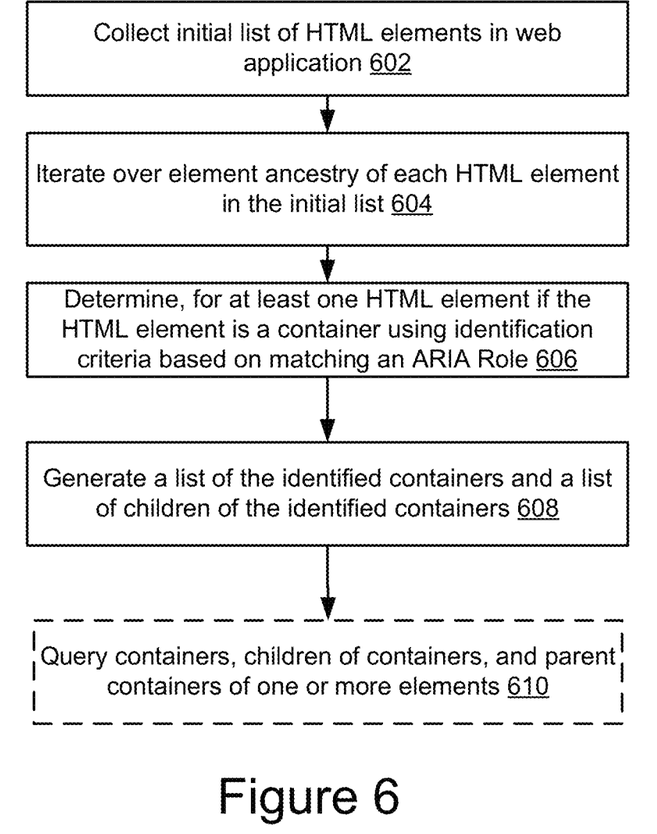
FIG. 6 is a flow chart of an example alternate method, based on ARIA roles, to generate container data in accordance with an implementation.

FIG. 6 is a flowchart in which the container identification algorithm is an ARIA role. In block 602, an initial list of HTML elements in the application is collected. In block 604, the process iterates over the element ancestry of each HTML element in the initial list. In block 606, a determination is made for at least one HTML element if the HTML element is a container using an identification criteria based on matching an ARIA role. In the most general case there may be one or more ARIA roles for which potential matches are identified. In block 608, a list is generated of the identified container and a list of children of the identified containers. In block 610, the process queries containers, children of containers, and parent containers of one or more elements.

Figure 7:
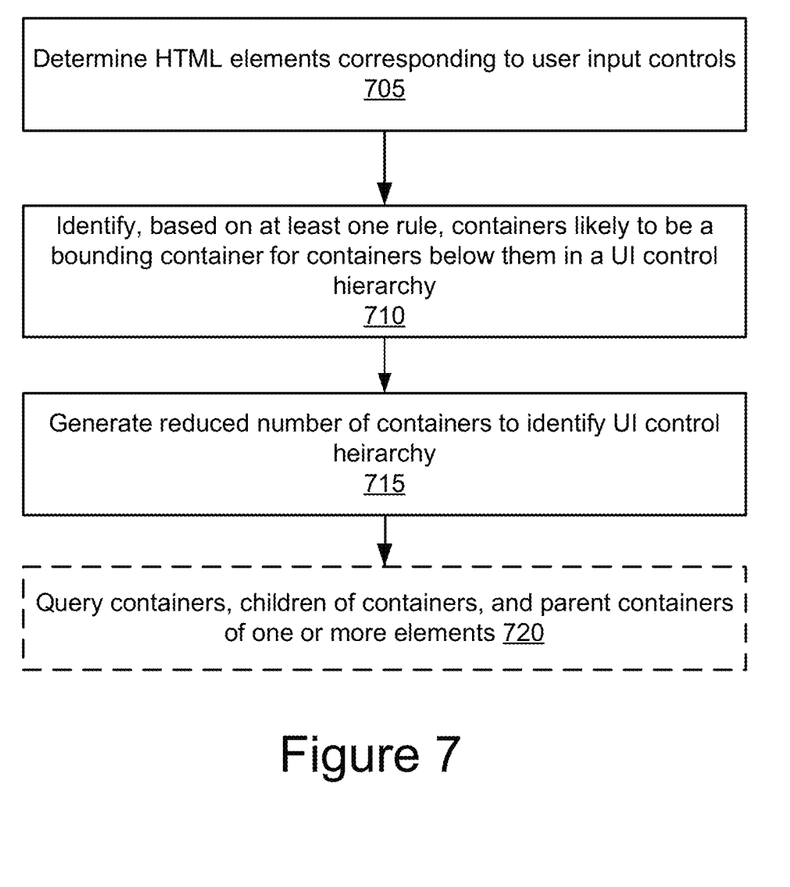
FIG. 7 is a flow chart of an example alternate method, based on identifying bounding containers, for generating container data in accordance with an implementation.

FIG. 7 is a flowchart of a high-level method for identifying containers likely to be bounding containers. In block 705, an initial list of HTML elements in the application is collected. In block 710, the process identified, based on at least one rule, containers likely to be bounding containers for containers below them in a UI control hierarchy. In some implementations, this may be performed using a count algorithm as described below in more detail. In block 715, a result of identifying bounding containers is that it permits the generation of a reduced number of containers to identify a UI control hierarchy. In block 720, the process queries containers, children of containers, and parent containers of one or more elements.

Figure 8:
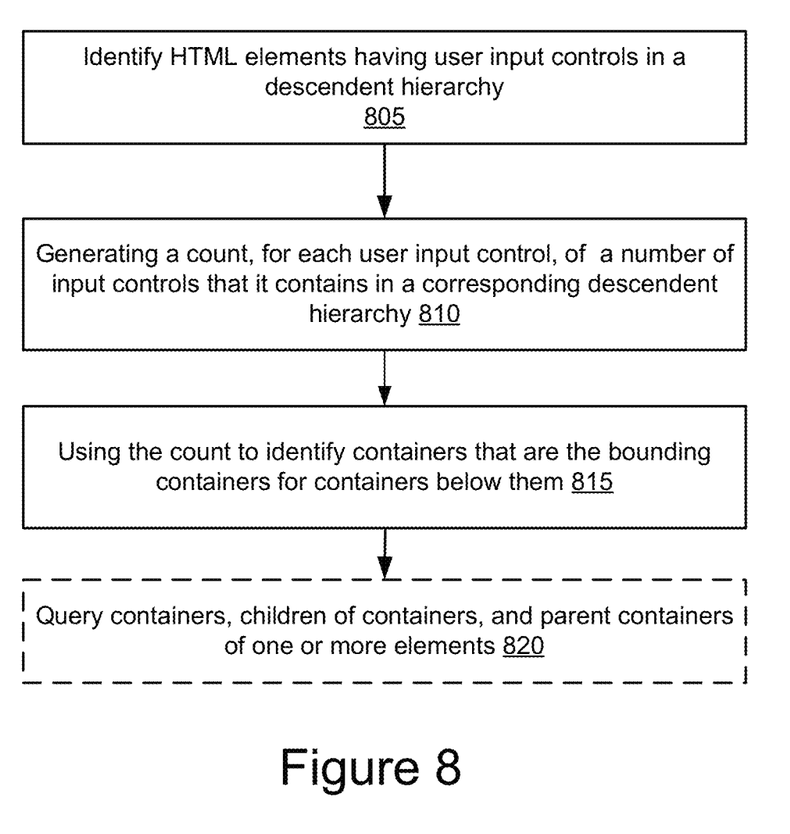
FIG. 8 is a flow chart of an example alternate method, based on a count technique, for generating container data in accordance with an implementation.

FIG. 8 is a flowchart of a method of using a count algorithm to determine bounding containers. In block 805, HTML elements are identified having user input controls in a descendent hierarchy. In block 810 a count is generated for each user input control of a number of input controls that it contains in a corresponding descendent hierarchy. In block 815, the count is used to identify containers that are the bounding containers for bounding other containers (or even bounding multiple containers) below them. This results in a reduction in the number of containers needed to identify the UI control hierarchy. In block 820, the process queries containers, children of containers, and parent containers of one or more elements.

An example of an input control count algorithm will now be described. User input controls are controls that are specially designated to receive user input. Some examples of user input controls include INPUT, SELECT, BUTTON, although more generally there may be other user input controls on an individual application basis. Thus, the algorithm can be generalized to include other types of user input controls.

The user input control count algorithm identifies containers, particularly in regards to aspects of the algorithm that identify a likelihood container is a bounding container for multiple bounding containers below them.

Figure 9:
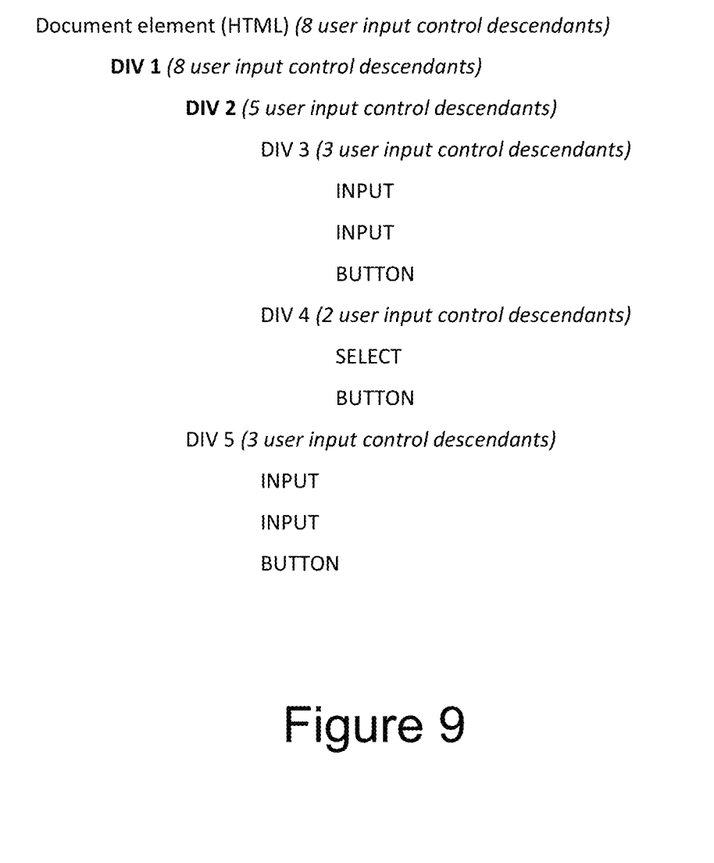
FIG. 9 illustrates aspects of the count technique of FIG. 8 in accordance with an implementation.

In one implementation, initially, every element that has a user input control in its descendant hierarchy is updated to have a count of the number of input controls that it contains, at any level below itself. After all counts have been completed, candidate container elements are examined. When the count of contained user input controls changes between levels of candidate container elements in the DOM, the element higher up is identified as a container. A change threshold can be added to only identify an element as a container if the difference in user input control count between it and its child exceeds a certain number or percentage FIG. 9 illustrates an example hierarchy and associated counts. DIV1 is identified as a container since it contains more user input controls than DIV2 or DIV3. DIV2 is a container because it contains more user input controls than DIV3 or DIV4.

Figure 10:
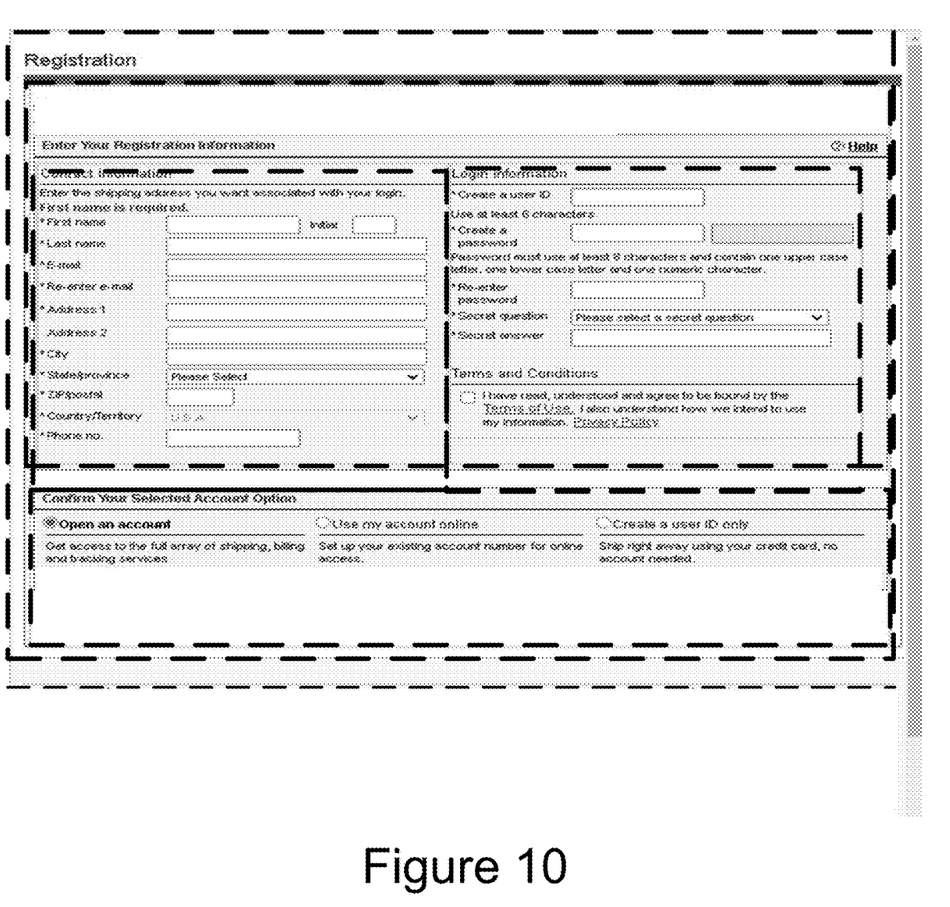
FIG. 10 is an example of a web application user interface with additional dashed lines to help illustrate aspects of the counting technique in accordance with an implementation.

FIG. 10 illustrates an example of elements that were automatically identified as containers based on the counting technique previously described. For the purposes of illustration, bounding regions corresponding to user input control count transitions are bounded in dashed lines.

It will be understood from the previous discussion that the container data may be queried to access data on containers and their hierarchies to facilitate identifying controls/control hierarchies for robotics process automation. For example, a large single page web application might have 7000 HTML elements on a page. As an illustrative example, 6000 of them could be physical containers. As an example, an INPUT that receives cardholder last name could have 20 physical containers in an initial version of the application (e.g., version 1.0.0) but 21 physical containers in an updated version (version 1.0.1) despite there being no visual or functional changes to the application. However, implementations of the present invention use heuristics to identify container controls, which is more relevant to automation of controls and more robust to minor changes in the underlying Web application. Additionally, the total size of the container data that must be stored and processed can be greatly reduced.

In the above description, for purposes of explanation, numerous specific details were set forth. It will be apparent, however, that the disclosed technologies can be practiced without any given subset of these specific details.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
   collecting a list of HTML elements of a Web application; and
   automatically determining if a particular HTML element in the list of HTML elements satisfies at least one container identification criteria indicative of a likelihood the particular HTML element is a permanent member of the Web application;
   identifying, based on the at least one container identification criteria, containers identifying a control hierarchy insensitive to internal layout changes in the Web application; and
   automating, based on the identified control hierarchy, user interface controls for the Web application that are insensitive to internal layout changes in the Web application.

2. The computer-implemented method of claim 1, wherein the at least one container identification criteria comprises an HTML5 tag criteria.

3. The computer-implemented method of claim 1, wherein the at least one container identification criteria comprises an Accessible Rich International Applications (ARIA) role.

4. The computer-implemented method of claim 1, wherein the at least one container identification criteria comprises identifying a bounding container for other containers.

5. The computer-implemented method of claim 4, wherein a bounding container is identified based at least in part on a count of user input controls in a descendent hierarchy.

6. The computer-implemented method of claim 1, wherein the method further comprises querying the containers to identify user interface controls for robotics process automation of a business process involving the Web application.

7. A computer-implemented method comprising:
   monitoring HTML elements of a Web application;
   automatically determining if at least one container identification criteria is satisfied indicative of a likelihood an HTML element is a candidate to be a container for automation of user interface controls of the Web application;
   identifying, based on the at least one container identification criteria, containers identifying a control hierarchy insensitive to internal layout changes in the Web application; and
   automating, based on the identified control hierarchy, user interface controls for the Web application that are insensitive to internal layout changes in the Web application.

8. The computer-implemented method of claim 5, wherein the at least one container identification criteria comprises an HTML5 tag criteria.

9. The computer-implemented method of claim 5, wherein the at least one container identification criteria comprises an Accessible Rich International Applications (ARIA) role.

10. The computer-implemented method of claim 5 wherein the at least one container identification criteria comprises identifying a bounding container for other containers.

11. The computer-implemented method of claim 10, wherein a bounding container is identified based at least in part on a count of user input controls in a descendent hierarchy.

12. The computer-implemented method of claim 10, wherein the at least one container identification criteria comprises an HTML5 tag criteria.

13. The computer-implemented method of claim 10, wherein the at least one container identification criteria comprises an Accessible Rich International Applications (ARIA) role.

14. The computer-implemented method of claim 10 wherein the at least one container identification criteria comprises identifying a bounding container for other containers.

15. The computer-implemented method of claim 14, wherein a bounding container is identified based at least in part on a count of user input controls in a descendent hierarchy.

16. A computer-implemented method comprising:
- monitoring HTML elements of a Web application;
- automatically determining if at least one container identification criteria is satisfied indicative of a likelihood an HTML element is a candidate to be a container for automation of user interface controls of the Web application;
- identifying, based on the at least one container identification criteria, containers identifying a control hierarchy insensitive to internal layout changes in the Web application;
- automating, based on the identified control hierarchy, user interface controls for the Web application that are insensitive to internal layout changes in the Web application; and
- performing robotics process automation of a business process that uses the Web application.

17. The method of claim 16 where utilizing the container data to perform robotics process automation comprises querying the containers to identify user interface controls for robotics process automation of a business process involving the Web application.

* * * * *